US012728460B2

(12) United States Patent
Harnickell et al.

(10) Patent No.: US 12,728,460 B2
(45) Date of Patent: Sep. 8, 2026

(54) MACHINING APPARATUS FOR OPTICAL LENSES, AND MANUFACTURING SYSTEM HAVING THE SAME

(71) Applicant: OptoTech AG, Zuchwil (CH)

(72) Inventors: Volker Harnickell, Rüttenen (CH); Ernst Bracher, Langendorf (CH)

(73) Assignee: OPTOTECH AG, Zuchwil (CH)

(*) Notice: Subject to any disclaimer, the term of this patent is extended or adjusted under 35 U.S.C. 154(b) by 645 days.

(21) Appl. No.: 18/201,884

(22) Filed: May 25, 2023

(65) Prior Publication Data

US 2023/0381866 A1 Nov. 30, 2023

(30) Foreign Application Priority Data

May 31, 2022 (EP) .................................... 22176407

(51) Int. Cl.
*B23B 1/00* (2006.01)
*B23B 5/00* (2006.01)
*B23B 13/12* (2006.01)

(52) U.S. Cl.
CPC .................. *B23B 1/00* (2013.01); *B23B 5/00* (2013.01); *B23B 13/126* (2013.01); *B23B 2215/40* (2013.01); *B23B 2228/10* (2013.01); *Y10T 29/52* (2015.01)

(58) Field of Classification Search
CPC ........... B23B 1/00; B23B 5/00; B23B 13/126; B23B 2215/40; Y10T 29/52; B23Q 37/007
See application file for complete search history.

(56) References Cited

U.S. PATENT DOCUMENTS

2003/0157869 A1* 8/2003 Luderich ................. B24B 9/146 451/240
2016/0214226 A1* 7/2016 Nagato ................ B23Q 37/007
2021/0107065 A1 4/2021 Mandler
(Continued)

FOREIGN PATENT DOCUMENTS

CN 208603339 U * 3/2019
DE 19809353 9/1999
DE 102004016445 10/2005
(Continued)

*Primary Examiner* — Jermie E Cozart
(74) *Attorney, Agent, or Firm* — Millen, White, Zelano & Branigan, P.C.; Christopher W. Brody

(57) ABSTRACT

A machining apparatus for machining optical lenses has a horizontally aligned conveyor section for transporting containers containing at least one optical lens, the conveyor section extending between an entry and opposite exit side of a module. The machining apparatus has a container buffer store and a container transport device, the latter being designed to retrieve containers from the conveyor section and to store said containers in the container buffer store and to transport containers back onto the conveyor section. A workpiece handling station having at least one parking space is provided for one container. The container transport device transports containers from the container buffer store to at least one parking space. A handling device of workpiece handling station retrieves optical lenses from a container standing on a parking spaces and transfers said container to a machining station. Moreover, the invention relates to a manufacturing system having two such machining apparatuses.

17 Claims, 4 Drawing Sheets

(56) References Cited

U.S. PATENT DOCUMENTS

| | | | |
|---|---|---|---|
| 2021/0170540 | A1 | 6/2021 | Schneider |
| 2021/0316414 | A1 | 10/2021 | Schneider et al. |

FOREIGN PATENT DOCUMENTS

| | | | | |
|---|---|---|---|---|
| DE | 102007050470 | | 9/2008 | |
| DE | 102007040395 | | 3/2009 | |
| DE | 102008064333 | | 7/2010 | |
| DE | 102013108766 | | 2/2015 | |
| DE | 102015102899 | | 9/2016 | |
| DE | 102015102900 | | 9/2016 | |
| DE | 102018007494 | A1 * | 3/2020 | ........... B23Q 7/1421 |
| DE | 102019127628 | | 4/2021 | |
| EP | 1473114 | | 11/2004 | |
| EP | 1473114 | A1 * | 11/2004 | ............. B24B 9/146 |
| EP | 2042265 | | 4/2009 | |
| EP | 3181291 | | 6/2017 | |
| EP | 3819092 | | 5/2021 | |
| JP | 02-269539 | | 11/1990 | |

* cited by examiner

MACHINING APPARATUS FOR OPTICAL LENSES, AND MANUFACTURING SYSTEM HAVING THE SAME

The invention relates to a machining apparatus for machining optical lenses and/or optical lens blanks as claimed in claim 1, and to a manufacturing system having at least two such machining apparatuses as claimed in claim 14.

Known from the prior art are a multiplicity of different machining apparatuses for machining optical lenses and/or optical lens blanks, for example for producing spectacle lenses. For example, a turning machine is described in DE 10 2019 127 628 A1. A simultaneous turning machine for simultaneously turning two lens blanks is disclosed in DE 10 2015 102 900 A1. Containers (job trays) having in each case two lens blanks are transported along a conveyor belt. A workpiece handling device retrieves from the latter the pair of lenses and in the same lifting cycle deposits two machined lenses back in the container. The retrieved lens blanks are then transferred to the workpiece holder of the turning stations and machined in the latter. A simultaneous milling device set forth in DE 10 2015 102 899 A1 is of a similar construction. For the more precise machining, a grinding machine is known from DE 198 09 353 A1, a polishing tool is known from DE 10 2013 108 766 A1, and a polishing device is known from DE 10 2007 050 470 A1, for example. In order to be able to fix lenses in the machining apparatuses, it is moreover known for the lenses to be adhesively bonded to blocking pieces by means of an adhesive, in particular an alloy. This is described, for example, in DE 10 2008 064 333 A1. As an alternative, there are mechanical and vacuum-based workpiece holders for lenses such as set forth, for example, in DE 10 2007 040 395 B4 and DE 10 2004 016 445 B4. From EP 3181 291 B1 it is furthermore known for the lenses to be machined to be provided with protective films which can again be removed in an automated manner from the lens by the device described therein. It is furthermore known from EP 3 819 092 A1 to retrieve lens blanks in an automated manner from wrappers in order for the lenses to be subsequently supplied to the downstream production machines in containers. Additionally, there are circumferential machining apparatuses, unblocking machines, for separating the lenses from blocking pieces (cf. EP 2 042 265 B1, for example), coating devices, cleaning machines and many more for ultimately manufacturing a spectacle lens from a lens blank. All these different operating steps are carried out using individual machining apparatuses. Only processes such as turning and milling or grinding and polishing, which are closely related, are to some extent unified in one machining apparatus.

In order to carry out the different operating steps, the lenses or lens blanks have to be transported to the different operating stations. To this end, the container for the lens pairs is already known in the first place, for example from said DE 10 2015 102 899 A1, DE 10 2015 102 900 A1, and EP 2042 265 B1.

In the simplest case, an operator carries the container with the lens pairs from one machine to the other. Already known from the general manufacturing concepts are factory concepts with machining islands and the manufacturing line concepts for lowering the complexity in terms of personnel. The manufacturing lines just mentioned are at least partially already used in the manufacturing of spectacle lenses, to which end individual machines are connected to one another by additional conveyor sections, in particular conveyor belts. In this way, pairs of optical lenses or optical lens blanks can be transported in an automated manner from one machining apparatus to the other machining apparatus in a container. The different throughput times of the combined machining apparatuses are problematic, which is why a central main conveyor section without machining apparatuses is utilized, and each machining apparatus is placed in a conveying loop of conveyor belts that branches horizontally from the main conveyor section. In this way, each machining apparatus can retrieve containers with lenses to be machined from the main conveyor section, and thereafter transport said containers at the apparatus-specific operating rate on the conveying loop. The retrieval of the optical lenses or lens blanks from the container then takes place inter glia with workpiece handling devices such as described, for example, in DE 10 2015 102 899 A1, said container being on the conveyor belt of the apparatus. The conveyor belt of the apparatus here forms a sub-portion of the conveying loop.

The significant complexity in terms of construction for linking the individual machining apparatuses to one another by way of additional conveying means is disadvantageous. The conveying loops which branch off laterally result in a fir tree-type layout of the manufacturing machines, which is very wide and very long, this leading to great distances for the operating personnel and the maintenance personnel. Above all, a space for operating and servicing has to be left between two adjacent conveying loops, as a result of which the main conveyor section also has a great length. The entire networking of the individual machines also presents a challenge because the accessibility to the machining apparatuses and conveying installations has to meet the requirements of occupational safety. For this purpose, cables and fluid lines above all are to be installed such that they do not present any impediment, and minimum widths for the passages have to be adhered to. The installation of the manufacturing system with such machining apparatuses is complex, requiring a lot of bespoke engineering, and the operation is labor intensive and a large set-up area is required.

It is therefore the object of the invention to overcome the disadvantages of the prior art and to provide a solution by way of which it is possible to provide a manufacturing system which has a small set-up area and can be installed in a simple and cost effective manner, offers easy access to the operators and maintenance personnel during operation, and nevertheless can at least partially compensate the different throughput times of the machining apparatuses.

The main features of the invention are set forth in claim 1 and in claim 14. Design embodiments are the subject matter of claims 2 to 13, 15, and of the description.

The invention relates to a machining apparatus for machining optical lenses and/or optical lens blanks, the machining apparatus being configured by a module. Said machining apparatus has a horizontally aligned conveyor section for transporting containers containing at least one, preferably at least two, and particularly preferably exactly two, optical lenses and/or optical lens blanks, the conveyor section extending from an entry side of the module to an opposite exit side of the module. According to the invention, the machining apparatus has a container buffer store and a container transport device. The container transport device is designed to retrieve containers from the conveyor section and to store said containers in the container buffer store, and is designed to transport containers back onto the conveyor section. Furthermore, the machining apparatus has a workpiece handling station having at least one, preferably at least two, furthermore preferably three, and particularly preferably four, parking spaces for in each case one container. The container transport device is furthermore designed to transport containers from the container buffer store (optionally also directly from the conveyor section) to the parking space or at least one of the parking spaces. The workpiece handling station in turn has a handling device which is designed to retrieve the optical lenses and/or optical lens blanks from a container standing on the parking space or on one of the parking spaces, and to transfer said container to a machining station (in particular the machining apparatus).

In this way, it is achieved according to the invention that buffering of the containers can take place within the module of the machining apparatus. To this end, the container buffer store is configured separately from the conveyor section, as a result of which the conveyor section can be short. In this way, a plurality of such machining apparatuses can be disposed in sequence behind one another. A conveying loop having an apparatus-specific conveying rate, and buffering the containers on the conveying loop, is not required. This simplifies the layout of a manufacturing system with such machining apparatuses. The commissioning of such manufacturing systems is correspondingly rapid and cost effective because no, or only very little, bespoke engineering has to be planned between the machining apparatuses. Moreover, in such a layout straight and short distances can be ensured for the operators and service personnel, for example operating being on one side of the row of machining apparatuses, and servicing being on the opposite side. Moreover, selective operation is possible with the machining apparatuses, i.e. optical lenses and/or optical lens blanks that are not to be machined can be simply conveyed to the exit site, without having to be retrieved with the container. This assumes the function of the branches from the main conveyor section to the conveying loops utilized in the prior art. The machining station is supplied with workpieces by the workpiece handling station, the latter in turn being supplied with containers from the buffered containers in the container buffer store, or directly from the conveyor section. If the container transport device is designed to optionally transport containers from the conveyor section directly to one of the parking spaces, prioritized containers can also easily overtake the buffered containers. This permits prioritizing of orders, either for the purpose of fulfilling customer requirements, or for optimizing the workload of the other machining apparatuses along the manufacturing system. The parking space, or the parking spaces, should not be associated with the container buffer store. Accordingly, the workpiece handling station should not be able to retrieve any optical lenses and/or optical lens blanks from the containers that are situated in the container buffer store. In this way, the container buffer store can store containers tightly in a small space, or dispose them on top of one another, without having to consider the accessibility to the content (the lenses).

According to one variant of the machining apparatus, the machining station has a machining device from a a) first group comprising preparatory devices, specifically
   - unpacking devices for retrieving the optical lenses and/or optical lens blanks from a packaging;
   - cleaning devices for cleaning the optical lenses and/or optical lens blanks;
   - block-mounting devices for connecting the optical lenses and/or optical lens blanks to a blocking piece;
   - laminating devices for adhesively bonding a protective film to areas of the optical lenses and/or optical lens blanks; and
   - marking devices for applying items of information to the optical lenses and/or optical lens blanks;

and/or b) second group comprising mechanical machining apparatuses, specifically
   - milling machines for machining the optical lenses and/or optical lens blanks by milling;
   - turning machine machines for machining the optical lenses and/or optical lens blanks by turning;
   - grinding machines for grinding the optical lenses and/or optical lens blanks;
   - polishing machines for polishing the optical lenses and/or optical lens blanks; and
   - circumferential machining apparatuses for producing a circumferential contour of the optical lenses and/or optical lens blanks;

and/or c) third group comprising surface treatment machines, specifically
   - coating devices for coating surfaces of the optical lenses and/or optical lens blanks; and
   - temperature-control devices for thermal treatment of the optical lenses and/or optical lens blanks;

and/or d) fourth group comprising post-machining apparatuses, specifically
   - measuring devices for determining parameters of the optical lenses and/or optical lens blanks;
   - film removal devices for removing protective films from the optical lenses and/or optical lens blanks;
   - unblocking devices for separating the optical lenses and/or optical lens blanks from a blocking piece;
   - cleaning devices for removing machining residues from the optical lenses and/or optical lens blanks; and
   - packing devices for packing the optical lenses and/or optical lens blanks in a packaging.

All these machining devices can fulfil one operating step in the machining of an optical lens, or optical lens blank. These machining devices are advantageously combined with the conveyor section, the container buffer store, the container handling device and the workpiece handling device, entirely independently of the type of the machining of the lenses, and thus form an advantageous module. Modules having identical and/or dissimilar machining devices have only to be disposed in sequence behind one another. For example, if the module with the milling device operates at double the rate of a module with a turning device, a pair of modules with turning devices can be simply placed behind one another so as to mutually adapt the capacities. In order for the capacity to be increased, a further module of the weakest manufacturing link can additionally simply be inserted, for example. If the capacity is to be lowered in the case of a plurality of modules of the weakest manufacturing link, one of these modules can simply be removed.

The machining device preferably has a workpiece receptacle, for example a chuck, a vacuum holder, or a gripper. The optical lens and/or the optical lens blank can be fixed by the latter during machining. For some processes, such as cleaning and coating, a simple tray without additional fixing of the lens can suffice as workpiece receptacle.

According to one optional design embodiment, the conveyor section extends from the entry side of the module to the opposite exit side of the module in such a manner that a second machining apparatus, embodied identically in terms of construction of the conveyor section, is able to be placed next to the machining apparatus so that the entry side of the second machining apparatus is, in particular directly, contiguous to the exit side of the machining apparatus, and the conveyor section of the second machining apparatus is an in particular direct continuation of the conveyor section of the machining apparatus. Accordingly, no additional conveying equipment between the machining apparatuses is required.

According to a potential embodiment of the machining apparatus, the entry side and the exit side are aligned so as to be mutually parallel and transverse, preferably perpendicular, to the conveyor section. As a result, the machining apparatuses can be disposed in sequence behind one another in a linear manner. This is preferably also possible without any offset, to which end the entry side and the exit side of the conveyor section should have the same position when viewed in the cross section of the machining apparatus.

In a special embodiment, the conveyor section has a conveyor belt or a roller track. This can be implemented in a simple manner in terms of construction. In the case of a conveyor belt, a transport belt usually revolves about a plurality of rollers. A roller track utilizes individual rollers as a transport section. By way of the latter, each container can be moved forward individually and at an individual speed, at least when roller track portions, or the individual rollers, are driven separately from one another.

In a particular design embodiment of the machining apparatus, the conveyor section is of a linear configuration, in particular over the entire length. This is simple in terms of construction, inexpensive and enables a linear conveyor section along the manufacturing system, this moreover permitting transportation of the containers in a reliable manner in terms of the process and without the risk of catching.

A particularity can lie in that the machining apparatus has a scanner for reading items of information pertaining to containers and/or optical lenses and/or optical lens blanks disposed on the conveyor section, and the container transport device is actuated by a retrieval logic which decides whether a container is retrieved from the conveyor section, or the container is conveyed to the exit side without being retrieved. Thus, it can be ensured that only the containers with lenses to be machined are retrieved. To this end, there should be a data connection between the scanner and the retrieval logic, for example a processor with a decision-making software. For optimizing a manufacturing system with a plurality of machining apparatuses, individual containers with lenses not to be machined could be additionally temporarily stored in a container buffer store, for example when the container buffer store of a downstream machining apparatus is full.

In one variant of embodiment, the module has a housing which on the entry side has a straight first housing wall, and which on the exit side has a second housing wall that is parallel to the first housing wall. As a result of the straight housing walls, the modules can be positioned tightly next to one another, and one module can be easily pulled out of the row as there is no nesting, for example. Straight is to be understood in the wider sense, because potential reinforcement corrugations and depressions, for connectors and the like, for example, are obviously innocuous to the person skilled in the art; a straight termination of the machine, in order to be able to place the machining apparatuses next to one another ideally without gaps, is more relevant.

It can be provided in particular that the conveyor section does not extend beyond the first and the second housing wall. In this way, the entire length of the conveyor section is utilized for handling and machining the lenses. A manufacturing system can be of a correspondingly short design, since no pure conveying paths along the manufacturing system are required, for example also not for providing any buffering with containers on these additional conveyor sections.

In one particular variant, the container transport device is designed to retrieve containers (exclusively) from one (first) portion of the conveyor section, but not from another (second) portion of the conveyor section. (The numbering in the first and the second portion does not refer to the conveying direction of the conveyor section but refers exclusively to a subdivision into a plurality of portions). In this way, a compact container transport device is achieved, since the operating range thereof along the conveyor section is limited. The second portion can be utilized as a horizontal buffer store, for example so as not to impede the retrieval and placing of containers in the first portion by following containers. The second portion in the conveying direction lies preferably ahead of the first portion. As a result, the following containers can be stopped in front of the first portion. The second portion can lie freely outside the housing, preferably on the upper side of the housing. In this way, transportation on the conveyor section can be visually observed from the outside. Errors are rapidly detected and can be addressed without opening the housing, at least on the second portion. It may also be expedient to be able to retrieve individual containers manually without complexity and to replace them again for the purpose of quality control. The first portion can be arranged within the housing. In this case, the housing forms a type of occupational safety casing to prevent the possibility of touching moving parts of the container transport device. Occupational safety measures can optionally be dispensed with if only minor actuating forces and speeds arise in the retrieval of the containers from the conveyor section. In this case, the first portion can also run freely outside the housing.

Furthermore, the housing can have a front side and a rear side, the conveyor section between the front side and the rear side running from the entry side to the exit side. At least one operating element is optionally disposed on the front side. Furthermore optionally, at least one service flap can be configured on the rear side of the housing. In this way, the operation can be focused on the front side of the machining apparatus or an entire row of machining apparatuses, whereby servicing takes place primarily from the rear side.

The containers are also referred to as trays or job trays by the person skilled in the art. Said containers are preferably composed of plastics material. Moreover, the containers should have an open upper side. This contributes toward a lightweight, robust construction which is not critical for comparatively hard components of the machining apparatus, and permits easy access to the lenses or lens blanks.

The optical lenses and optical lens blanks can be composed of optically permeable class or plastics material. The optical lenses and optical lens blanks should have opposite faces which are either already optically effective or are machined so as to form optically effective faces. The optically effective faces can be configured concavely and/or convexly. The optical lenses and optical lens blanks here preferably have a round circumference, whereby the circumference during the manufacturing of the spectacle lenses can however be adapted so as to be oval or to fit the opening of a spectacle frame sooner or later in the manufacturing process.

According to a detailed design embodiment, the container buffer store has storage spaces for the containers that are disposed on top of one another. A vertical storage is achieved in this way, which makes do with a small footprint. This contributes toward a small footprint of the machining apparatus and the manufacturing system overall. The storage spaces preferably lie below the conveyor section, in particular so as to be co-aligned with the conveyor section below the latter. A conveyor shaft by way of which the containers can be moved up and down by the container transport device is preferably configured adjacent to the container buffer store.

The storage spaces can in particular be configured by horizontally accessible shelf spaces. This permits individual storing and retrieving, without being tied to a FIFO (first in/first out) or LIFO (last in/first out) procedure. In this way, the machining rates of machining apparatuses of a manufacturing system can be adapted to one another, or prioritized containers can be channeled through the manufacturing system more rapidly than non-prioritized containers. In the case of alternative direct stacking, only the upper container can always be removed in the simplest case, this resulting in a LIFO (last in/first out) procedure. In particular, the container transport device could be designed to extract the lowermost container (in this case a FIFO procedure) or else any arbitrary container from the container stack. In most cases however, the increased storage capacity of stacks in comparison to shelf spacing is not economical in view of the increased technical complexity for the flexible retrieval from the stack. The container buffer store preferably offers space for at least three, preferably at least four, in particular preferably at least five, containers.

The container transport device can have at least one first container receptacle for lifting and moving a container. Consequently, the container is no longer moved along any track but lifted through the space. This can be implemented in a space-saving manner. Optionally, the container transport device can have at least one second container receptacle by way of which a second container is able to be lifted and moved independently of the first container receptacle. In this way, two containers can be maneuvered simultaneously, for example one from the conveyor section into the container buffer store, and a second from the container buffer store onto the parking space, or one of the parking spaces. The first and/or the second container receptacle can be configured, for example, by a lift with forks, a gripper, hooks, or a suction pad, or at least have such a component.

The handling device of the workpiece handling station should furthermore be designed to retrieve an optical lens and/or optical lens blank from the machining station and to deposit said optical lens and/or optical lens blank in a container which is on one of the parking spaces. The handling device can have at least one gripper or at least one suction pad, preferably a pair thereof, so as to hold two optical lenses and/or optical lens blanks.

Furthermore, the parking spaces can be configured on a turntable, in particular in such a manner that the containers change the parking space as a function of an angle of rotation of the turntable, and as a result are rotated to the accessible range of the container transport device or of the handling device. As a result, loading procedures of the machining apparatus can be carried out rapidly, because the container transport device and the handling device can operate simultaneously without colliding. The turntable is preferably disposed below the container buffer store. The turntable optionally protrudes partially into the vertical alignment of the container buffer store.

According to a special design embodiment it is provided that the container transport device has a plurality of depositing and receiving positions, all depositing and retrieving positions being disposed vertically on top of one another, preferably so as to be vertically aligned. As a results, the container transport device can be of a configuration which is simple and compact in terms of the base area of the latter. This plurality of depositing and retrieving positions preferably includes one position on the conveyor section, at least two (in particular all) storage spaces of the container buffer store, and one position which is identical to a parking space of the workpiece handling station.

In a special variant of embodiment, the turntable has three or four parking spaces and correspondingly three or four rotary positions which are to be approached and by way of which the positions of the parking spaces can be swapped,

- the container transport device being designed to deposit a container on the parking space in at least one first rotary position, and to retrieve said container, in particular exclusively in this first rotary position; and
- the workpiece handling station being designed to retrieve optical lenses and/or optical lens blanks from a container on the parking space in at least one of the other rotary positions and to deposit said optical lenses and/or optical lens blanks.

If access to the container transport device is restricted to one of the parking spaces, the latter can lie below the container buffer store, for example, so that space is saved. The same applies if the workpiece handling station can access only one of the parking spaces assigned thereto. The further parking spaces in this instance serve as short-term buffers, so that loading of the machining apparatus can continue immediately once a partial rotation of the turntable (for example, 120 degrees or 90 degrees) has been completed.

In the case of the container transport device, a box having machined lenses is always first removed and a new box placed in this instance. The turntable is then rotated. Meanwhile, on the workpiece handling device, the lenses are retrieved from a container and machined lenses are deposited into a container.

The invention moreover relates to a manufacturing system having a first and a second machining apparatus as described above and hereunder, wherein the second machining apparatus is placed next to the first machining apparatus so that the entry side of the second machining apparatus is, in particular directly, contiguous to the exit side of the first machining apparatus, and the conveyor section of the second machining apparatus is in particular a direct continuation of the conveyor section of the first machining apparatus. A manufacturing system having two machining apparatuses is achieved in this way without requiring manual moving of the containers, or moving by a central main conveyor section with conveying loops between the apparatuses.

A core application of the invention is present when the first and the second machining apparatus have in each case one machining device from the second group, specifically that of the mechanical machining apparatuses.

For doubling the capacity it can be provided in particular that at least two of the mutually contiguous machining apparatuses have a machining device of identical construction. In this instance, the container transport device of the first machining apparatus retrieves the first half of the containers from the conveyor section, and the second half is retrieved by that of the second machining apparatus.

Alternatively or additionally it can be provided that a third machining apparatus as described above and hereunder is placed in front of the first machining apparatus such that the exit side of the third machining apparatus is, in particular directly, contiguous to the entry side of the first machining apparatus, and the conveyor section of the first machining apparatus is an in particular direct continuation of the conveyor section of the third machining apparatus, the third machining apparatus having a machining device from the first group, specifically that of the preparatory devices. (The numbering is not to be understood to mean that the aforementioned second machining apparatus is required. The numbering is a pure identification number, not an indication of sequence or continuous numbering. This applies also to the further description).

Furthermore alternatively or additionally, it can be provided that a fourth machining apparatus as described above and hereunder is placed behind the second machining apparatus so that the entry side of the fourth machining apparatus is, in particular directly, contiguous to the exit side of the second machining apparatus, and the conveyor section of the fourth machining apparatus is an in particular direct continuation of the conveyor section of the second machining apparatus, the fourth machining apparatus having a machining device from the third group, specifically that of the surface treatment machines, or the fourth group, specifically that of the post-machining apparatuses.

In a particular design embodiment, the machining apparatuses in terms of the container buffer store, the container transport device and optionally also at least substantially the workpiece handling station are of identical configuration. The conveyor section and/or the housing and/or a machine frame can optionally also be embodied so as to be at least substantially of identical construction. A large number of common parts are achieved thereby, as a result of which the costs for the manufacturing system are low and spare parts for repairs are standardized. Advantages are also achieved in terms of servicing, because a system of an identical type is to be maintained at all times. In particular the optional turntable of the workpiece handling station here can still be embodied in an identical construction without problems. The handling device by way of which the lenses are then moved to the machining device can be individually adapted to this machining device. This is because different motion sequences, target positions and transfers may be required for this interface.

It is furthermore expedient that either a uniform length of the machining apparatuses is provided, or else at least only a minor number of different defined lengths. This results in one module or a minor number of modules, which are then completed in particular with a desired machining device. This also minimizes the number of different components of the manufacturing system. In the event of damage, the entire machine does not have to be potentially removed from the manufacturing line, but the machining device is simply replaced. This modularity even makes possible a change of use of the machining apparatus by replacing the machining device with a different one. As a result, the costs for updating machines are also lower than in the case of a replacement of the entire machining apparatus.

The operating elements and controls of the machining devices can also be individually configured.

No additional conveying elements are preferably disposed between the adjacent machining apparatuses. However, not all installation sides permit this, which is why additional conveying elements can optionally be used, for example to bridge an opening in a shed or a transition between sheds or a change in the height level, or to provide an L-shaped or U-shaped layout of the manufacturing system.

Furthermore, the manufacturing system should have a central machine controller by way of which the individual machining apparatuses can be centrally actuated. The machining apparatuses can however readily have additional local control units which interact with the central machine controller.

Further features, details and advantages of the invention are derived from the wording of the claims and from the following description of exemplary embodiments by means of the drawings.

Figure 1:
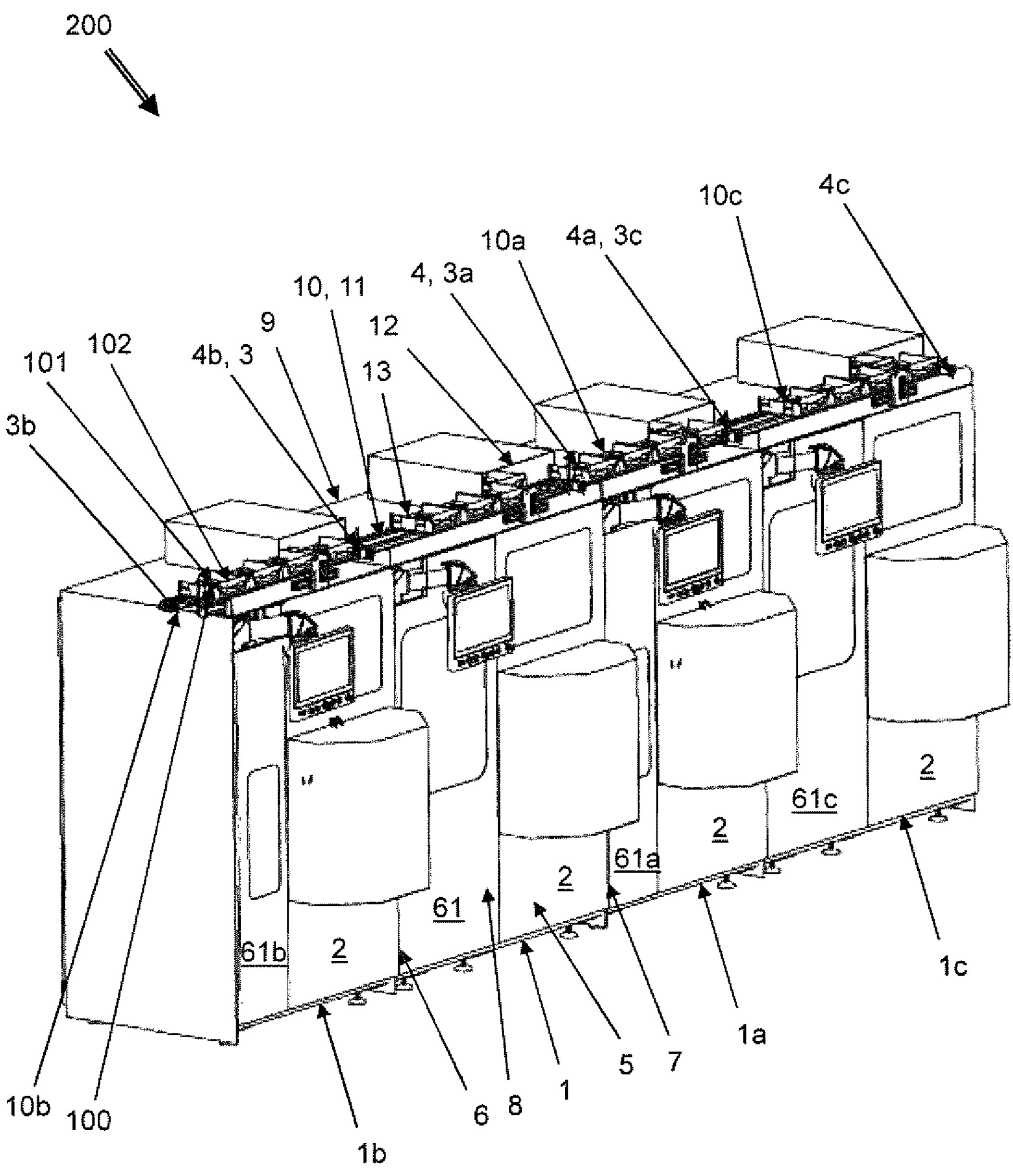
FIG. 1 shows a perspective view of a manufacturing system having four machining apparatuses disposed in sequence behind one another.

FIG. 1 shows a perspective view of a manufacturing system 200 having four machining apparatuses 1, 1*a*, 1*b*, 1*c* which are disposed behind one another in sequence. A second machining apparatus 1*a* is placed behind a first machining apparatus 1 in such a manner that an entry side 3*a* of the second machining apparatus 1*a* is directly contiguous to an exit side 4 of the first machining apparatus 1, and a conveyor section 10*a* of the second machining apparatus 1*a* is a direct continuation of conveyor section 10 of the first machining apparatus 1. For example, the first and the second machining apparatus 1, 1*a* have in each case one machining device 61, 61*a* from the group of the mechanical machining apparatuses. The use of two machining device 61, 61*a* of identical construction is also possible here.

Placed in front of the first machining apparatus 1 is a third machining apparatus 1*b* so that an exit side 4*b* of the third machining apparatus 1*b* is directly contiguous to an entry side 3 of the first machining apparatus 1, and the conveyor section 10 of the first machining apparatus 1 is a direct continuation of a conveyor section 10*b* of the third machining apparatus 1. For example, the third machining apparatus 1 can have a machining device 61*b* from the group of preparatory devices.

Placed behind the second machining apparatus 1*a* is also a fourth machining apparatus 1*c* so that an entry side 3*c* of the fourth machining apparatus 1*c* is directly contiguous to an exit side 4*a* of the second machining apparatus 1*a*, and a conveyor section 10*c* of the fourth machining apparatus 1*a* is a direct continuation of the conveyor section 10*a* of the second machining apparatus 1*a*. The fourth machining apparatus 1*c* can have, for example, a machining device 61*c* from the group of the surface treatment machines or of the post-machining apparatuses. More details pertaining to the different machining devices will follow.

Figure 2:
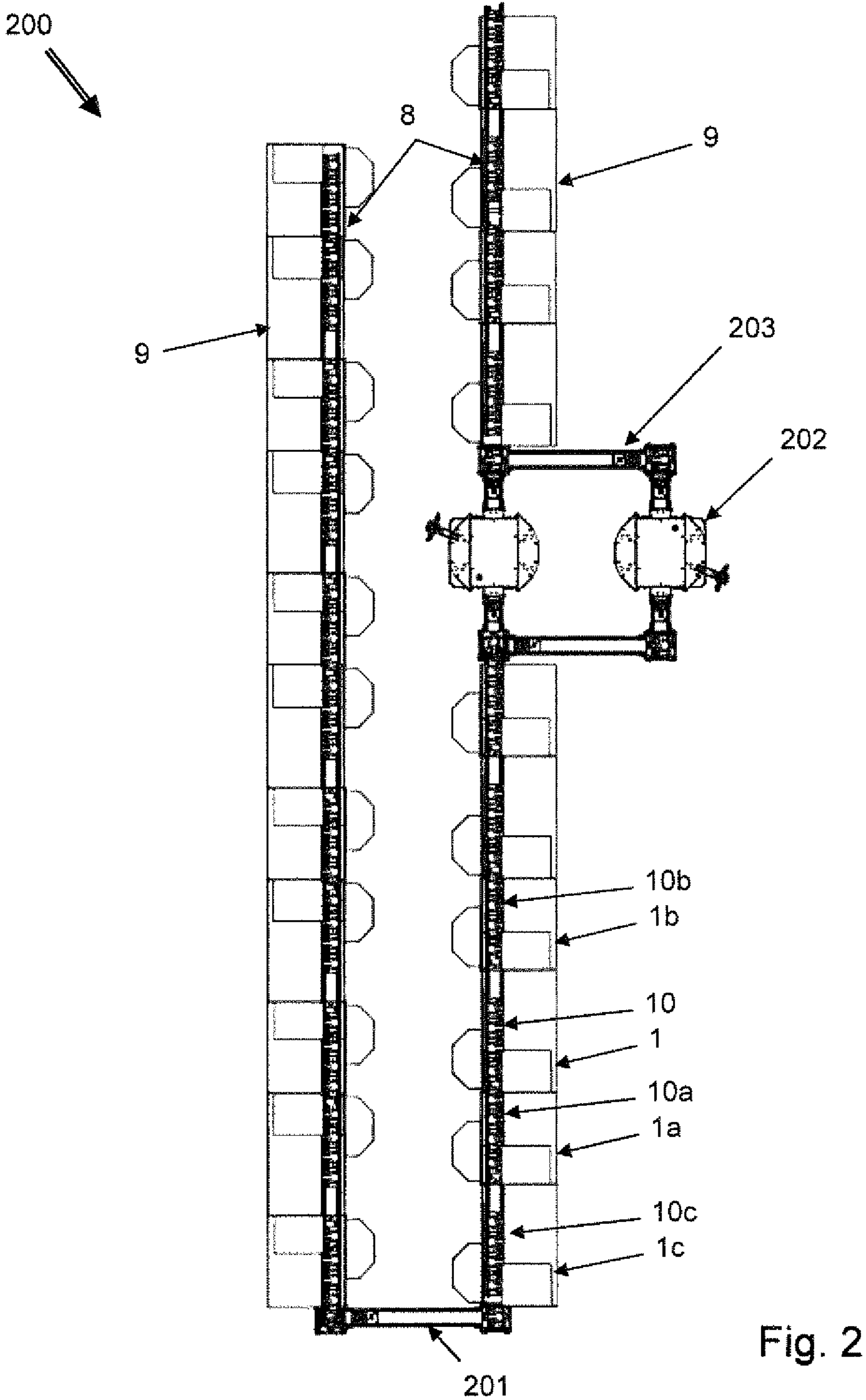
FIG. 2 shows a manufacturing system having a U-shaped layout and a multiplicity of machining apparatuses.

The manufacturing system 200 illustrated in FIG. 1 can be upgraded so as, for example, to form a longer manufacturing system 200, as is shown in a bird's eye view in FIG. 2. It can be seen there that numerous further machining apparatuses are placed behind one another in sequence. In the case of overall conveyor sections of such a length, a U-shaped layout in which a reversal of direction 201 is provided in the center of the overall conveyor section makes sense. As can be seen, the front side 8, in particular the operator side, is directed inward. As a result, the operator can reach all of the machining apparatuses via a short distance. In contrast, the rear sides 9 of the machining apparatuses 1, 1*a*, 1*b*, 1*c*, in particular the service sides, point outward. In terms of servicing, the short distance is often less relevant than generous available working spaces.

Figure 4:
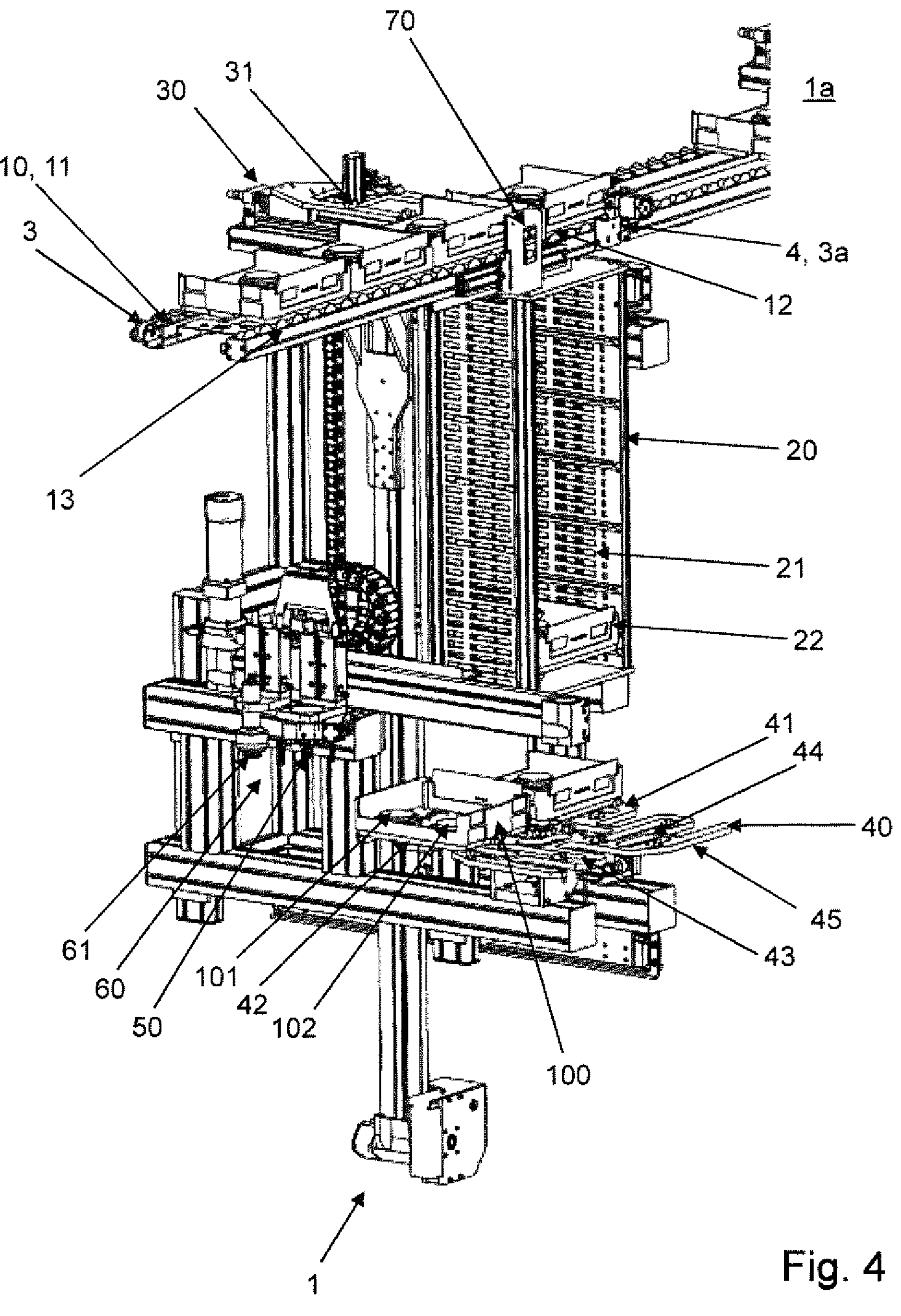
FIG. 4 shows a perspective view of selected components of two machining apparatuses disposed in sequence behind one another.

In the manufacturing system 200 as per FIGS. 1 and 4 it is possible in principle that the machining apparatuses 1, 1*a*, 1*b*, 1*c* in terms of the container buffer store 20, the container transport device 30 and at least substantially the workpiece handling station 40 are configured to be of identical construction. The housings 5, the conveyor sections 10, 10*a*, 10*b*, 10*c* and potential machine frames can also be at least substantially of identical construction.

The conveyor sections 10, 10*a*, 10*b*, 10*c*, or machining apparatuses 1, 1*a*, 1*b*, 1*c* as illustrated in FIG. 2, respectively, can also have different lengths, so as to receive different machining devices 61, 61*a*, 61*b*, 61*c*, for example. According to FIG. 2, the restriction here is three different, defined construction lengths.

As can be seen in FIG. 2, despite the modular fundamental concept, a special machine 202 with a conveying loop 203 can be inserted between the machining apparatuses 1, 1*a*, 1*b*, 1*c* according to the invention if required in that direct sequencing of the machining apparatuses 1, 1*a*, 1*b*, 1*c* according to the invention is dispensed with there.

No additional conveying elements are disposed between all further machining apparatuses 1, 1*a*, 1*b*, 1*c*. Optionally however, there is the possibility of adapting the layout to the installation site in that, for example, an opening in a shed or a change in the height level is overcome by a separate conveyor section, or an L-shaped layout is chosen to utilize an L-shaped setting-up area.

Figure 3:
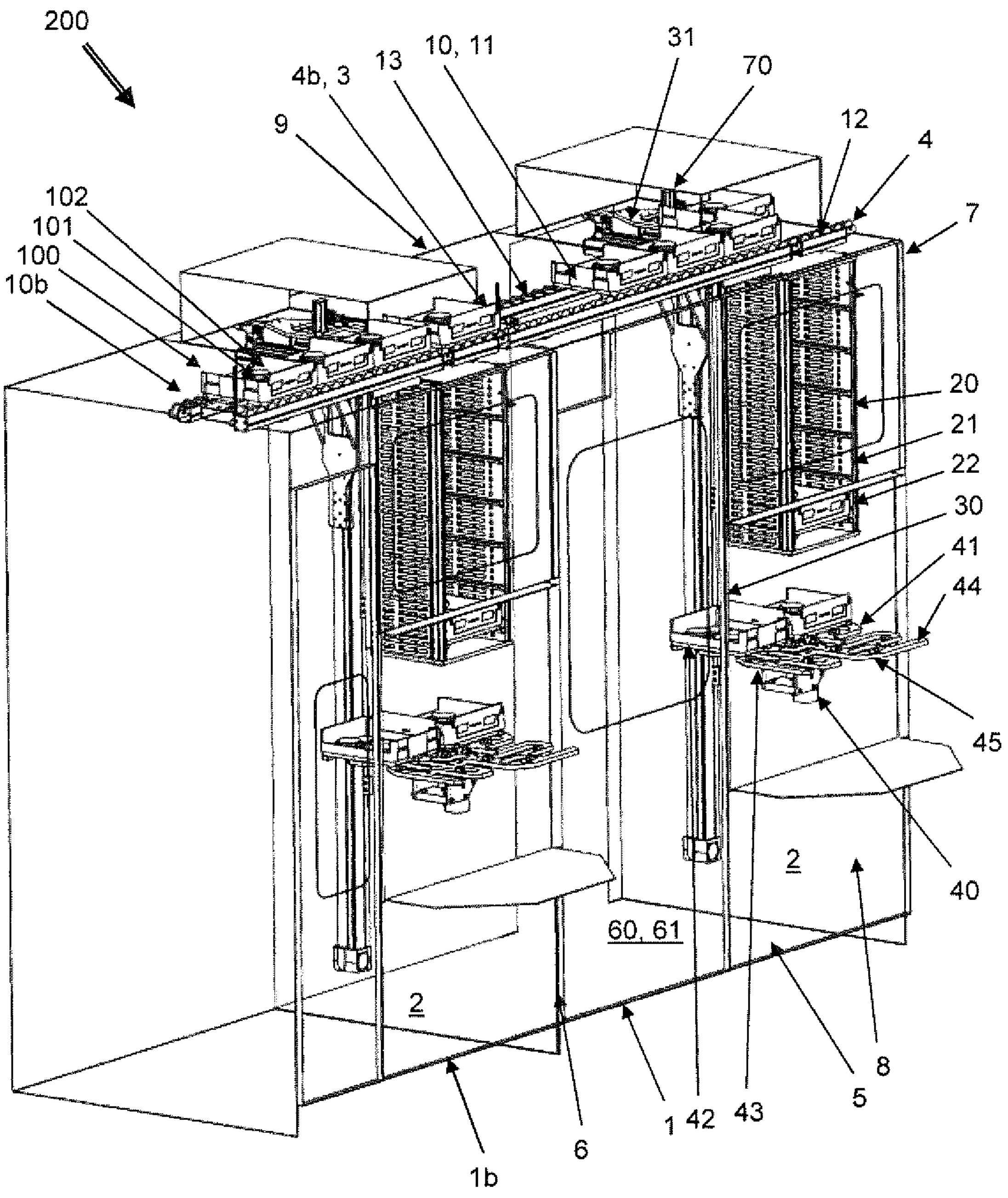
FIG. 3 shows a perspective fragment of two machining apparatuses disposed in sequence behind one another, having a housing illustrated as transparent and a machining station omitted.

Potential technical design embodiments of details of the machining apparatuses 1, 1*a*, 1*b*, 1*c* shown in FIGS. 1 and 2 are derived from FIGS. 3 and 4.

FIG. 3 shows a perspective fragment of two machining apparatuses 1, 1*b*, which are disposed behind one another in sequence and have a housing 5 illustrated as transparent and a machining station 60 omitted. Selected components of two machining apparatuses 1, 1*a* disposed behind one another in sequence can be seen once more in a perspective view in FIG. 4. Identical reference signs therefore refer to components of the same type.

To be seen in particular in FIG. 3 is a machining apparatus 1 for machining optical lenses and/or optical lens blanks 101, 102. The entire machining apparatus 1, as well as the second machining apparatus 1*b*, is configured as a module 2. The latter has a horizontally running conveyor section 10 for transporting containers 100 containing exactly two optical lenses and/or optical lens blanks 101, 102. The conveyor section 10 extends from an entry side 3 of the module 2 to an opposite exit side 4 of the module 2, in particular in such a manner that a second machining apparatus 1*b*, embodied identically in terms of construction of the conveyor section 10, is able to be placed next to the machining apparatus 1 that the exit side 4*b* of the second machining apparatus 1*b* is directly contiguous to the entry side 3 of the machining apparatus 1, and the conveyor section 10 of the machining apparatus 1 is a continuation of the conveyor section 10*b* of the second machining apparatus 1*b*. It can be seen that the entry side 3 and the exit side 4 are aligned so as to be mutually parallel and transverse, here perpendicular, to the conveyor section 10.

The conveyor section 10 can have a conveyor belt or a roller track 11 and is presently configured in a linear manner across the entire length, in particular when viewed from above as well as in the vertical profile. Moreover, the conveyor section 10 in geodetic terms is horizontally aligned.

Disposed in the housing 5 of the module 2 is a container buffer store 20 having a plurality of, here six, storage spaces 21, 22. The storage spaces 21, 22 are disposed vertically on top of one another and embodied as horizontally accessible shelf spaces. The storage spaces 21, 22 are aligned below the conveyor section 10; this may be complete or partial alignment. Configured in front of the storage spaces 21, 22 is a vertical shaft by way of which the containers 100 can be moved up and down in front of the container buffer store 20, in particular without said containers 100 having to be placed obliquely. To this end, the shaft has a larger base area than the containers 100.

For transporting the containers 100 the machining apparatus 1 has a container transport device The container transport device 30 is designed to retrieve containers 100 from the conveyor section 10 and to store said containers 100 in the container buffer store 20. Said container transport device 30 also handles the return of the containers 100 onto the conveyor section 10. As can be seen, a first portion 12 of the conveyor section 10 runs past the container transport device 30, and a second portion 13 of the conveyor section 10 runs freely on the upper side of the housing 5. The second portion 13 presently lies in in front of the first portion 12 in the conveying direction of the conveyor section 10. A scanner 70 for reading items of information pertaining to containers 100 and/or optical lenses and/or optical lens blanks 101, 102 that are on the conveyor section 10 is disposed in the region of this first portion 12. The container transport device 30 is actuated by a retrieval logic which, using the items of information of the scanner 70, decides whether a container 100 is retrieved from the conveyor section 10, or if the container 100 is conveyed to the exit side 4 by the conveyor section 10 without being retrieved.

For handling the containers 100, the container transport device 30 has at least one first container receptacle 31 for lifting and moving a container 100. This can be a lift having a container slide, gripper, fork, hook or suction pad, or at least have such a component. Shown presently is a fork-shaped receptacle which moves below the container 100, can raise the latter, and lift said container 100 into the region of a conveying shaft adjacent to the container buffer store 20. The container 100 is then moved up and down in this conveying shaft.

The housing 5 has a front side 8 and a rear side 9, and the conveyor section 10 runs parallel between the front side 8 and the rear side 9, from the entry side 3 to the exit side 4. A straight first housing wall 6 of the housing lies on the entry side 3, and a second housing wall 7, which is parallel to the first housing wall 6, lies on the exit side 4. The conveyor section 10 does not extend beyond the first and the second housing wall 6, 7 (if at all a few centimeters (<5 cm)). Operating elements can in particular be disposed on the front side 8. Service flaps can be provided on the rear side 9 of the housing 5. Optionally, operating elements are also disposed on the rear side 9 so as to allow the maintenance personnel to carry out specific operations of the machining apparatus 1 without having to access the opposite machine side for this purpose.

The containers 100, which can also be referred to as trays or job trays, are preferably composed of plastics material and have an open upper side. Exactly two optical lenses or optical lens blanks 101, 102 lie in said containers 100 in the present case. Said optical lenses or optical lens blanks 101, 102 can be composed of optically permeable glass or plastics material, and have opposite faces which are either already optically effective, or are machined so as to form optically effective faces. The optically effective faces 101, 102 can be configured concavely and/or convexly. The optical lenses or optical lens blanks 101, 102 can have a round circumference, but during the manufacturing of the spectacle lenses also be adapted so as to be oval, or to fit the opening of a spectacle frame.

Furthermore, the machining apparatus 1 has a workpiece handling station 40 having exactly 4 parking spaces 41, 42, 43, 44 for in each case one container 100. The four parking spaces 41, 42, 43, 44 are configured on a turntable 45 so that the containers 100 as a function of an angle of rotation of the turntable 45 can change the parking space 41, 42, 43, 44 and as a result are rotated to the access area of the container transport device 30 or of a handling device 50. The container transport device 30 and the handling device 50 can in each case access at least one of the parking spaces 41, 42, 43, 44. The turntable 45 has four rotary positions to be approached, whereby the container transport device 30 is designed to deposit a container 100 on the parking space 41 in the first rotary position and to retrieve said container 100.

The workpiece handling station 40 has the handling device 50 which is designed to retrieve the optical lenses and/or optical lens blanks 101, 102 from a container 100, which is on the parking space or one of the parking spaces 42, 43, and to transfer said optical lenses and/or optical lens blanks 101, 102 to a machining station 60. Moreover, the handling device 50 is designed to retrieve the optical lenses and/or optical lens blanks 101, 102 from the machining station 60 and to deposit said optical lenses and/or optical lens blanks 101, 102 in a container 100 which is on one of the parking spaces 42, 43. To this end, the handling device 50 can have at least one gripper or at least one suction pad, preferably a pair thereof, so as to hold one or two optical lenses and/or optical lens blanks 101, 102. Variants having four grippers or suction plates are also conceivable, so as not to have to move back to a container 100 on the parking spaces 42, 43 between retrieving one lens pair from the working station and re-supplying a lens pair to be machined.

The machining station 60 can in particular have a machining device 61 from a a) first group comprising preparatory devices, specifically
   - unpacking devices for retrieving the optical lenses and/or optical lens blanks 101, 102 from a packaging;
   - cleaning devices for cleaning the optical lenses and/or optical lens blanks 101, 102;
   - block-mounting devices for connecting the optical lenses and/or optical lens blanks 101, 102 to a blocking piece;
   - laminating devices for adhesively bonding a protective film to areas of the optical lenses and/or optical lens blanks 101, 102; and
   - marking devices for applying items of information to the optical lenses and/or optical lens blanks 101, 102;

and/or b) second group comprising mechanical machining apparatuses, specifically
   - milling machines for machining the optical lenses and/or optical lens blanks 101, 102 by milling;
   - turning machine machines for machining the optical lenses and/or optical lens blanks 101, 102 by turning;
   - grinding machines for grinding the optical lenses and/or optical lens blanks 101, 102;
   - polishing machines for polishing the optical lenses and/or optical lens blanks 101, 102; and
   - circumferential machining apparatuses for producing a circumferential contour of the optical lenses and/or optical lens blanks 101, 102;

and/or c) third group comprising surface treatment machines, specifically
   - coating devices for coating surfaces of the optical lenses and/or optical lens blanks 101, 102; and
   - temperature-control devices for thermal treatment of the optical lenses and/or optical lens blanks 101, 102;

and/or d) fourth group comprising post-machining apparatuses, specifically
   - measuring devices for determining parameters of the optical lenses and/or optical lens blanks 101, 102;
   - film removal devices for removing protective films from the optical lenses and/or optical lens blanks 101, 102;
   - unblocking devices for separating the optical lenses and/or optical lens blanks 101, 102 from a blocking piece;
   - cleaning devices for removing machining residues from the optical lenses and/or optical lens blanks 101, 102; and
   - packing devices for packing the optical lenses and/or optical lens blanks 101, 102 in a packaging.

The invention is not limited to one of the above-described embodiments but may be modified in many ways.

All of the features and advantages, including details of construction, spatial arrangements and method steps, which are derived from the claims, the description and the drawing, may be relevant to the invention both individually as well as in the most varied combinations.

| List of reference signs | |
|---|---|
| 1 | Machining apparatus (BM) |
| 2 | Module |
| 3 | Entry side of the module |
| 4 | Exit side of the module |
| 5 | Housing |
| 6 | First housing wall |
| 7 | Second housing wall |
| 8 | Front side |
| 9 | Rear side |
| 10 | Conveyor section |
| 11 | Roller track |
| 12 | First portion of the conveyor section |
| 13 | Second portion of the conveyor section |
| 20 | Container buffer store |
| 21 | Storage space |
| 22 | Storage space |
| 30 | Container transport device |
| 31 | First container receptacle |
| 40 | Workpiece handling station |
| 41 | Parking space |
| 42 | Parking space |
| 43 | Parking space |
| 44 | Parking space |
| 45 | Turntable |
| 50 | Handling device of the workpiece handling station |
| 60 | Machining station |
| 61 | Machining device |
| 70 | Scanner |
| 100 | Container |
| 101 | Optical lens or optical lens blank |
| 102 | Optical lens or optical lens blank |

-continued

| List of reference signs | |
|---|---|
| 200 | Manufacturing system |
| 201 | Reversal of direction |
| 1a | Second machining apparatus |
| 3a | Entry side (2nd BM) |
| 4a | Exit side (2nd BM) |
| 10a | Conveyor section (2nd BM) |
| 61a | Machining device (2nd BM) |
| 1b | Third machining apparatus |
| 3b | Entry side (3rd BM) |
| 4b | Exit side (3rd BM) |
| 10b | Conveyor section (3rd BM) |
| 60b | Machining station (3rd BM) |
| 61b | Machining device (3rd BM) |
| 1c | Fourth machining apparatus |
| 3c | Entry side (4th BM) |
| 4c | Exit side (4th BM) |
| 10c | Conveyor section (4th BM) |
| 61c | Machining device (4th BM) |

The invention claimed is:

1. A machining apparatus (1) for machining optical lenses and/or optical lens blanks (101, 102), the machining apparatus (1) being configured by a module (2)

having a horizontally aligned conveyor section (10) for transporting containers (100) containing at least one optical lens and/or optical lens blank (101, 102), the conveyor section (10) extending from an entry side (3) of the module (2) to an opposite exit side (4) of the module (2), wherein the machining apparatus (1) has a container buffer store (20) and a container transport device (30), the container transport device (30) being designed to retrieve containers (100) from the conveyor section (10) and store said containers (100) in the container buffer store (20), and being designed to transport containers (100) back onto the conveyor section (10), the machining apparatus (1) having a workpiece handling station (40) having at least one parking space (41, 42, 43, 44) for in each case one container (100), the container transport device (30) being designed to transport containers (100) from the container buffer store (20) to the at least one parking space, or at least one of a plurality of parking spaces (41, 42, 43, 44), the workpiece handling station (40) having a handling device (50) which is designed to retrieve the at least one optical lens and/or optical lens blank (101, 102) from a container (100) standing on the at least one parking space, or one of the plurality of parking spaces (41, 42, 43, 44) and to transfer said container (100) to a machining station (60).

2. The machining apparatus (1) as claimed in claim 1, wherein the machining station (60) has a machining device (61) from a) a first group comprising preparatory devices, which includes unpacking devices for retrieving the at least one optical lens and/or optical lens blank (101, 102) from a packaging;

cleaning devices for cleaning the at least one optical lens and/or optical lens blank (101, 102);

block-mounting devices for connecting the at least one optical lens and/or optical lens blank (101, 102) to a blocking piece;

laminating devices for adhesively bonding a protective film to areas of the at least one optical lens and/or optical lens blank (101, 102); and marking devices for applying items of information to the at least one optical lens and/or optical lens blank (101, 102);

and/or b) a second group comprising mechanical machining apparatuses, which includes milling machines for machining the at least one optical lens and/or optical lens blank (101, 102) by milling;

turning machines for machining the at least one optical lens and/or optical lens blank (101, 102) by turning;

grinding machines for grinding the at least one optical lens and/or optical lens blank (101, 102);

polishing machines for polishing the at least one optical lens and/or optical lens blank (101, 102); and circumferential machining apparatuses for producing a circumferential contour of the at least one optical lens and/or optical lens blank (101, 102);

and/or c) a third group comprising surface treatment machines, which includes coating devices for coating surfaces of the at least one optical lens and/or optical lens blank (101, 102); and temperature-control devices for thermal treatment of the at least one optical lens and/or optical lens blank (101, 102);

and/or d) a fourth group comprising post-machining apparatuses, which includes measuring devices for determining parameters of the at least one optical lens and/or optical lens blank (101, 102);

film removal devices for removing protective films from the at least one optical lens and/or optical lens blank (101, 102);

unblocking devices for separating the at least one optical lens and/or optical lens blank from a blocking piece;

cleaning devices for removing machining residues from the at least one optical lens and/or optical lens blank (101, 102); and packing devices for packing the at least one optical lens and/or optical lens blank in a packaging.

3. The machining apparatus (1) as claimed in claim 1, wherein the conveyor section (10) extends from the entry side (3) of the module (2) to the opposite exit side (4) of the module (2) in such a manner that a second machining apparatus (1*a*), embodied identically in terms of construction of the conveyor section (10), is able to be placed next to the machining apparatus (1) so that the entry side (3*a*) of the second machining apparatus (1*a*) is contiguous to the exit side (4) of the machining apparatus (1), and the conveyor section (10*a*) of the second machining apparatus (1*a*) is a continuation of the conveyor section (10) of the machining apparatus (1).

4. The machining apparatus (1) as claimed in claim 3, wherein the entry side (3) and the exit side (4) are aligned so as to be mutually parallel and transverse to the conveyor section (10).

5. The machining apparatus (1) as claimed in claim 1, wherein the conveyor section (10) has a conveyor belt or a roller track (11).

6. The machining apparatus (1) as claimed in claim 1, wherein the conveyor section (10) is of linear configuration.

7. The machining apparatus (1) as claimed in claim 1, wherein said machining apparatus (1) has a scanner (70) for reading items of information from containers (100) and/or the at least one optical lens and/or optical lens blank (101, 102) on the conveyor section (10), and the container transport device (30) is actuated by a retrieval logic which decides whether a container (100) is retrieved from the conveyor section (10) or the container (100) is conveyed to the exit side (4) without being retrieved.

8. The machining apparatus (1) as claimed in claim 1, wherein the module (2) has a housing (5) which on the entry side (3) has a straight first housing wall (6), and which on the exit side (4) has a second housing wall (7) that is parallel to the first housing wall (6).

9. The machining apparatus (1) as claimed in claim 8, wherein the conveyor section (10) does not extend beyond the first and the second housing wall (6, 7).

10. The machining apparatus (1) as claimed in claim 8, wherein the container transport device (30) is designed to retrieve containers (100) from one portion (12) of the conveyor section (10) but not from another portion (13) of the conveyor section (10).

11. The machining apparatus (1) as claimed in claim 1, wherein the container buffer store (20) for the containers (100) has storage spaces (21, 22) that are disposed on top of one another.

12. The machining apparatus (1) as claimed in claim 11, wherein the storage spaces (21, 22) are configured by horizontally accessible shelf spaces.

13. The machining apparatus (1) as claimed in claim 1, wherein the at least one parking space comprises a plurality of parking spaces (41, 42, 43, 44), the plurality of parking spaces being configured on a turntable (45).

14. The machining apparatus (1) as claimed in claim 1, wherein the horizontally aligned conveyor section (10) for transporting containers (100) contains at least two or exactly two optical lenses and/or optical lens blanks (101, 102).

15. The machining apparatus (1) as claimed in claim 1, wherein the machining apparatus (1) having a workpiece handling station (40) comprises at least two or more parking spaces (41, 42, 43, 44) for each container (100).

16. A manufacturing system (200) having a first and a second machining apparatus (1, 1*a*) as claimed in claim 1, the second machining apparatus (1*a*) being placed next to the first machining apparatus (1) so that the entry side (3*a*) of the second machining apparatus (1*a*) is contiguous to the exit side (4) of the first machining apparatus (1), and the conveyor section (10*a*) of the second machining apparatus (1*a*) is a continuation of the conveyor section (10) of the first machining apparatus (1).

17. The manufacturing system (200) as claimed in claim 16, wherein the container buffer store (20) and the container transport device (30) of the first and second machining apparatuses (1, 1*a*, 1*b*, 1*c*) are of identical configuration.

* * * * *